United States Patent [19]

Matthews

[11] 4,245,960

[45] Jan. 20, 1981

[54] CONNECTING STRUCTURE FOR A HUB AND FAN BLADE

[75] Inventor: David G. Matthews, Libertyville, Ill.

[73] Assignee: Air Drive, Inc., Libertyville, Ill.

[21] Appl. No.: 939,331

[22] Filed: Sep. 5, 1978

[51] Int. Cl.³ ............................................. F04D 29/20
[52] U.S. Cl. ............................ 416/244 R; 416/214 R; 403/242
[58] Field of Search ......... 416/214 R, 244 R, DIG. 3; 403/240, 242, 282, 284

[56] References Cited

U.S. PATENT DOCUMENTS

| | | | |
|---|---|---|---|
| 2,794,509 | 6/1957 | Mix | 416/214 |
| 3,734,697 | 5/1973 | Sieghartner | 416/244 |
| 3,937,595 | 2/1976 | English et al. | 416/244 R |

FOREIGN PATENT DOCUMENTS 2226024  11/1974  France ............................. 416/DIG. 3

*Primary Examiner*—Everette A. Powell, Jr.
*Assistant Examiner*—A. N. Trausch, III
*Attorney, Agent, or Firm*—Hill, Van Santen, Steadman, Chiara & Simpson

[57] ABSTRACT

A structure for interlocking relatively thin sheet material with a relatively heavy member, such as, for example a hub member with a sheet metal fan blade structure and the like to provide a rigid durable interlocking connection therebetween, in which, in the example given, the hub member is provided with an annular sleeve which extends through a bore in the central portion of the fan blade or other member, the hub member having an upstanding flange in the form of an annular shoulder spaced rearwardly from the free end of the sleeve and of greater diameter than the latter, with the shoulder being radially spaced from the sleeve by a groove having a radial width approximately equal to the thickness of the sheet member. The sleeve is divided into a plurality of segments, alternate segments flaring outwardly into engagement with the material of the blade member forming the periphery of the bore therein, and the free ends of the intermediate segments being bent over and forced into the material of the sheet member, moving the adjacent material thereof into the groove and forming, in effect, a spline-like connection between the two members.

6 Claims, 5 Drawing Figures

U.S. Patent Jan. 20, 1981 4,245,960
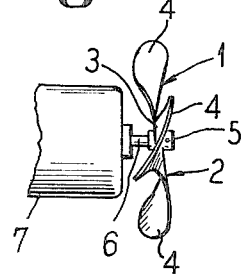
Fig. 1
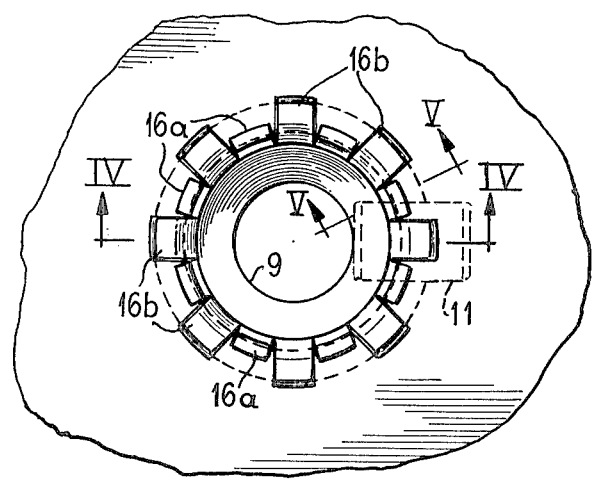
Fig. 3
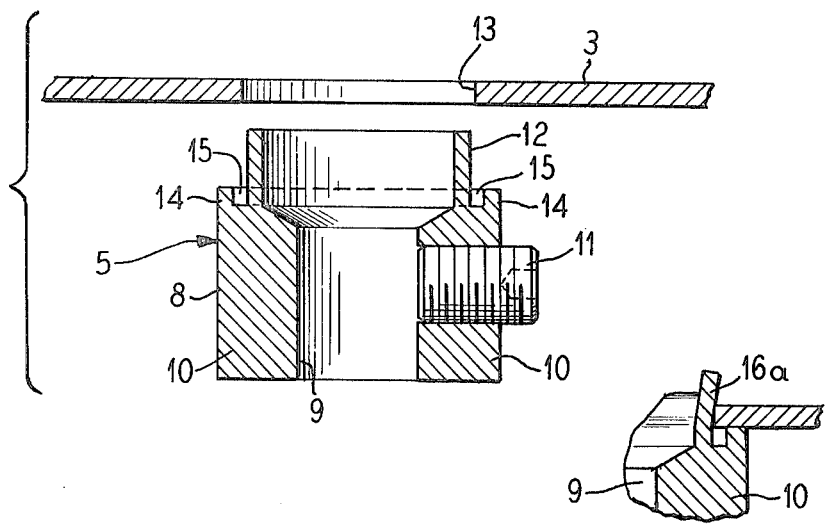
Fig. 2
Fig. 5
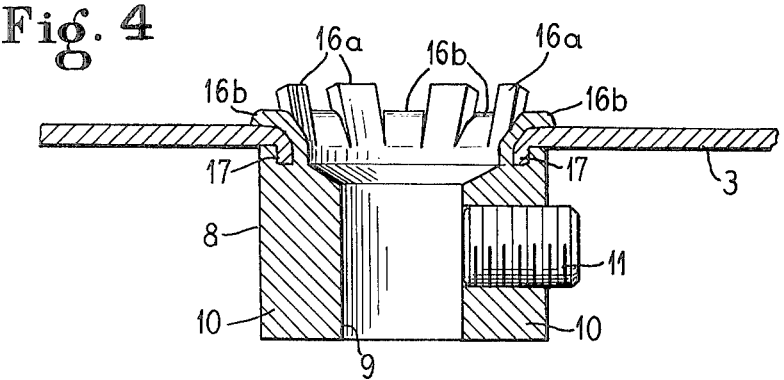
Fig. 4

CONNECTING STRUCTURE FOR A HUB AND FAN BLADE

BACKGROUND OF THE INVENTION

The invention relates to an arrangement for effecting a very rigid connection between relatively thin sheet material and a heavier member. A typical example of such a structure in the connection between fan blade members and the like, with a central hub member, by means of which the blade member is adapted to be connected to a rotatable drive shaft or the like. Other examples of this type of structure are for bushings, sleeves, and various types of fasteners.

For the purpose of illustration, the invention will be described and explained in connection with the connection of relatively thin fan blade members with a relatively heavy hub member, where problems of torque transmittal are involved.

It is common practice in the construction of fan blades and the like, having a central hub member, to secure a tubular-shaped hub member to a flat sheet-like central hub receiving portion of the fan blade or other structure, by forming the hub member with an axially extending sleeve adapted to be inserted into a bore in such central hub receiving portion of the blade member, with the sleeve having an outer diameter approximately equal to the diameter of the central bore of the blade member. The hub member is provided with an outwardly extending shoulder at the inner end of the sleeve, upon which the adjacent face of the blade member abuts.

The sleeve of the hub member is designed with such a length that, following insertion in the bore of the blade member, it may be suitably formed, as for example by a swaging or spinning operation, or the like, into an outwardly extending flange which overlies the peripheral portions of the blade member defining the bore therein, thus clamping the blade member between the shoulder and flange of the hub member.

While such clamping action may, at least initially, firmly clamp the hub and blade members, often following use, the blade member may become relatively loose on the hub member and the frictional engagement between the two parts, which must carry all torque forces transmitted by the hub to the blade member, become reduced to a point where slippage may take place therebetween.

While it is possible to form the hub member with a central bore which includes one or more integral keys or splines, adapted to cooperate with corresponding splines initially on the hub member, the fabrication of the individual blade and hub members with key or spline configurations becomes relatively costly and thus increases the cost of the assembly.

BRIEF SUMMARY OF THE INVENTION

Problems such as this are solved in the present invention by employing a blade member or the like, of relatively soft sheet material, for example aluminum, which has a circular bore therein adapted to receive a relatively smooth-wall sleeve formed on a hub member of relatively harder material, for example, a suitable steel. The latter is provided with a shoulder disposed adjacent the inner end of the sleeve, upon which the adjacent face of the blade member is adapted to abut, with the shoulder being radially outwardly spaced from the outer face of the sleeve by an axially extending annular groove having a radial width which is approximately equal to the thickness of the material of the central portion of the blade member.

Following such assembly of the blade members, the free outer end of the sleeve is deformed by a shearing action to divide the sleeve into a plurality of axially extending segments, alternate segments of which are flared outwardly into engagement with the periphery of the central bore in the blade member, while the intermediate segments are deformed or bent over, biting into the relatively soft material of the blade member to deform the engaged material of the blade member into the groove, which preferably has a depth approximately equal to the thickness of the material of the blade member, whereby the deformed portions of the latter will seat on the bottom of such groove. Such intermediate segments thus form splines which in the deformation of the adjacent material of the blade member, form cooperable grooves therein, in which such segments are disposed.

The hub member thus, in effect, is splined to the blade member and at the same time the latter is provided with flange portions extending transversely to the general plane of the blade member, providing additional rigidity in the blade member at the hub member, with the bent or swaged over portions of such intermediate segments securely clamping the blade member in rigid engagement with the hub member.

An extremely rigid and efficient connection is thus provided between the blade and hub members.

It will be apparent that the same basic construction can be employed with structures involving relatively thin sheet material, for example securing threaded fasteners, bushings, etc. to sheet material boards, etc.

BRIEF DESCRIPTION OF THE DRAWINGS

In the drawings wherein like reference characters indicate like or corresponding parts:

FIG. 1 is a side elevational view of a fan blade structure mounted on a motor driven shaft;

FIG. 2 is an axial sectional view of a hub member and a portion of a cooperable blade member, prior to assembly;

FIG. 3 is a top plan view of the completed assembly;

FIG. 4 is a sectional view taken approximately on the line IV—IV of FIG. 3; and

FIG. 5 is a sectional view taken approximately on the line V—V of FIG. 3.

DETAILED DESCRIPTION OF THE INVENTION

Referring to FIG. 1, the fan blade structure, indicated generally by the numeral 1, comprises a blade member 2 having a central portion 3 from which extend a plurality of blades 4. Connected to the central portion 3 is a hub member 5 by means of which the blade structure may be mounted on the drive shaft 6 of a motor 7.

A large number of blades of this type are constructed from sheet metal suitably configurated and bent to form the blade member, to which is secured a separately formed hub member 5.

Referring more particularly to FIGS. 2 through 5, the hub member 5 is provided with a cylindrical tubular body portion 8 having a central bore 9, adapted to receive the drive shaft of a motor or other driving means, with the member 8 having relatively thick walls 10 in which is threaded a set screw 11, by means of which the hub may be locked to a shaft inserted in the bore 9. Integrally formed with the body portion 8 and extending in an axial direction from one end of the latter is a coaxial sleeve 12 which is relatively thin in radial thickness as compared with the corresponding thickness of the body portion 8, with the outer diameter of the sleeve being approximately equal to the diameter of the bore 13 in the central portion 3 of the blade member 2, whereby the sleeve 12 may be readily inserted into and snugly fitted to the bore 13. The body member 8 is also provided with a radially extending shoulder 14 disposed adjacent the inner end of the sleeve 12 and spaced therefrom by an annular groove 15, the radial width of which is approximately equal to the thickness of the central portion 3 of the blade member.

In assembling the blade and hub members, the sleeve 12 of the hub member is inserted into the bore 13 with the bottom surface of the central portion 3, as viewed in FIG. 2, seated on the shoulder 14, after which by means of a suitable tool, a plurality of shear cuts are formed in the free end of the sleeve 12 to divide the same into a plurality of axially extending segments 16a and 16b. The alternate segments 16a are deformed slightly to provide a flared configuration, as illustrated in FIG. 5, whereby the outer surface of such segments are brought into firm engagement with the peripheral edge of the bore 13 but insufficient to materially deform the peripheral portion of the blade member. The intermediate segments 16b, however, are deformed to a considerably greater extent than the alternate segments 16a, whereby such intermediate segments are bent over toward and engage the adjacent upper face of the central portion of the blade member, as viewed in FIG. 4.

As previously mentioned, the blade member 2 is formed from a relatively soft material, while the hub member 5 is formed from a relatively harder material, whereby upon bending over of the segments 16b, the latter will be forced into the material of the central portion 3 shearing the latter along the side edges of the segments and flowing the material of the blade member into the groove 15 as indicated at 17.

The staking or swaging operation described may be performed in a single step, or in two steps, depending upon the configuration of the tooling employed in connection therewith.

It will be appreciated that the segments 16b and the grooves or channels formed in the central portion 3 of the fan blade member, as a result of the deforming of the segments 16b produces, in effect, a splined connection between the blade and hub members that will provide a very durable and strong connection therebetween that will withstand any torque stresses that may be transmitted from one to the other. Likewise, the bent-over portions 17, of the central portion 3 of the blade member, form individual flanges seated in the groove 15 thus tending to stiffen and add further rigidity between the two members. The alternate segments 16a preferably are deformed merely sufficiently to firmly engage the peripheral edge of the bore 13 but insufficient to materially cut into or shear the central portion 3 to insure the retention of an adequate spline interposed between adjacent segments 16b. It iwll be appreciated that if all of the segments were completely bent over corresponding to the segments 16b, the central portion 3 would be relatively uniformly deformed thereby obliterating the spline configuration and thus reducing the torque-transmission capabilities of the structure.

The proportioning and number of segments 16 will, of course, depend upon the size of the hub member, the thickness of the central portion 3 of the blade member, etc. and could, for example, follow normal spline proportioning in correspondence to the characteristics of the materials from which the respective members are constructed.

Instead of the member 5 as a hub member, it could serve as an internally threaded bushing, standarded, panel fastener guides etc., all of which may embody the interlocking structure. Likewise, depending upon the application, the heavier member may be in the form of a bar member, rectangular or frame members of other configuration.

It will be appreciated from the above disclosure that the present invention provides a strong durable mechanical interlock between two members, in particular hub and blade structures, thereby not relying solely upon frictional clamping forces, etc.

It will further be appreciated that the present invention in effect provides a splined connection between the two members without requiring initial formation of splines and the like in the two parts which are to be subsequently assembled, thereby eliminating relatively costly tooling and enabling the blade member to be formed with relatively simple stamping dies, etc., and the heavier member, when in the form of a hub member, bushing or similar member, to be readily manufactured by automatic screw operations and the like.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A structure for connecting two members at a line of connection, a first of said two members being in the form of a relatively thin sheet-like formation at the line of connection and having an abutting edge, the second of said two members being relatively heavier in the direction transverse to the sheet-like formation of the first member, said second member having a groove therein extending along the line of connection, said groove having a width approximately equal to the thickness of said sheet-like formation of the first member and forming two spaced upstanding shoulders, one of said two shoulders extending beyond the other shoulder by a dimension greater than the thickness of said first member, said one shoulder being divided into a plurality of segments with alternate segments being in one group and the intermediate segments being in a second group, said first member being seated on an upper edge of the other shoulder with said abutting edge in contact against the segments of the one shoulder, each of the intermediate segments having a free end extending beyond the abutting edge and being deformed toward and into engagement with the first member, said first member at each point of engagement with the intermediate segments having a portion extending into said groove to prevent relative movement along the line of connection.

2. A structure according to claim 1, wherein said alternate segments extend outwardly beyond said abutting edge and are flared laterally toward said abutting edge.

3. A structure according to claim 1, wherein said groove has a depth approximately equal to the thickness of said sheet-like formation of the first member, with the portions of said sheet-like formation extending into said groove having the inner edge thereof seated on the bottom of said groove.

4. A structure according to claim 1, wherein said first member is a fan blade and the second member is a hub structure for said fan blade, said fan blade having a flat sheet-like central hub receiving portion provided with a central bore defining said abutting edge, said hub structure having an axially extending passage, said one shoulder being a sleeve extending coaxial with the passage and having an outer diameter which is substantially equal to the diameter of the central bore in the first member, said groove being an annular groove concentric to said sleeve to separate the sleeve from the other shoulder, which is concentric with the sleeve and has a diameter greater than the outer diameter of said sleeve, the alternate segments of said sleeve flaring outward into engagement with the abutting edge of the bore in the first member and the free ends of the intermediate segments of the sleeve being bent over and into engagement with the central portion of the fan blade, said fan blade having material at the portions engaged by the intermediate segments extending into said groove to prevent relative rotational movement between the members.

5. A structure according to claim 4, wherein the portions of the central portion of the first member engaged by the intermediate segments having depression-like channels formed by the portion extending into the groove, said channels coacting with the intermediate segments to form a spline connection between the fan blade and hub member.

6. A structure according to claim 4, wherein said annular groove has an axial depth approximately equal to the thickness of the material of said central portion, each of the portions of the central portion of the first member engaged by the intermediate segments extending into said groove with an inner edge thereof seated on the bottom of said groove.

* * * * *